United States Patent [19]

Escue

[11] Patent Number: 4,575,098

[45] Date of Patent: Mar. 11, 1986

[54] ROTATABLE SHAFT SEALING ASSEMBLY WITH FLOWABLE MATERIAL SPACER MEANS

[76] Inventor: Jesse W. Escue, 611 Joyce Rd., Joliet, Ill. 60435

[21] Appl. No.: 767,237

[22] Filed: Aug. 19, 1985

[51] Int. Cl.$^4$ .............................................. F16J 15/34
[52] U.S. Cl. ..................... 277/9; 277/81 R; 277/197; 277/93 R; 277/194
[58] Field of Search ...................... 277/1, 9, 11, 38–41, 277/44–46, 53, 55, 81 R, 81 S, 91, 93 R, 93 SD, 192–195, 152, 197–199

[56] References Cited

U.S. PATENT DOCUMENTS

| | | | |
|---|---|---|---|
| 2,925,291 | 2/1960 | Bygbjerg | 277/9 X |
| 2,932,535 | 4/1960 | Peickii et al. | 277/152 X |
| 3,072,414 | 1/1963 | Porges | 277/93 R |
| 3,334,549 | 8/1967 | Sheldon | 277/188 R X |
| 4,215,870 | 8/1980 | Escue | 277/93 R |
| 4,423,878 | 1/1984 | Escue | 277/1 |

FOREIGN PATENT DOCUMENTS 832187  5/1981  U.S.S.R. .................................. 277/1

*Primary Examiner*—Robert S. Ward
*Attorney, Agent, or Firm*—Wood, Dalton, Phillips, Mason & Rowe

[57] ABSTRACT

A sealing assembly for a device having a rotatable shaft. The sealing assembly includes a stationary seal in association with the device having an opening generally conforming to the rotatable shaft together with a rotatable seal adapted to engage and cooperate with the stationary seal for effecting a seal therebetween. The rotatable seal is adapted to be mounted on the rotatable shaft for rotational movement therewith and includes a collar having an opening generally conforming to the rotatable shaft. The opening in the collar is defined by a normally undersized shaft-confronting surface and the collar is split through the opening along a diameter to include a pair of substantially identical portions. The sealing assembly also includes a spacer formed of a flowable material adapted to be disposed between the substantially identical portions of the collar for sealingly conforming the collar to the rotatable shaft within a normal tolerance range for rotatable shafts. With this arrangement, the substantially identical portions of the collar are secured together in engagement with the rotatable shaft to cause the flowable material of the spacer to fill any gaps between the collar and the rotatable shaft.

18 Claims, 2 Drawing Figures

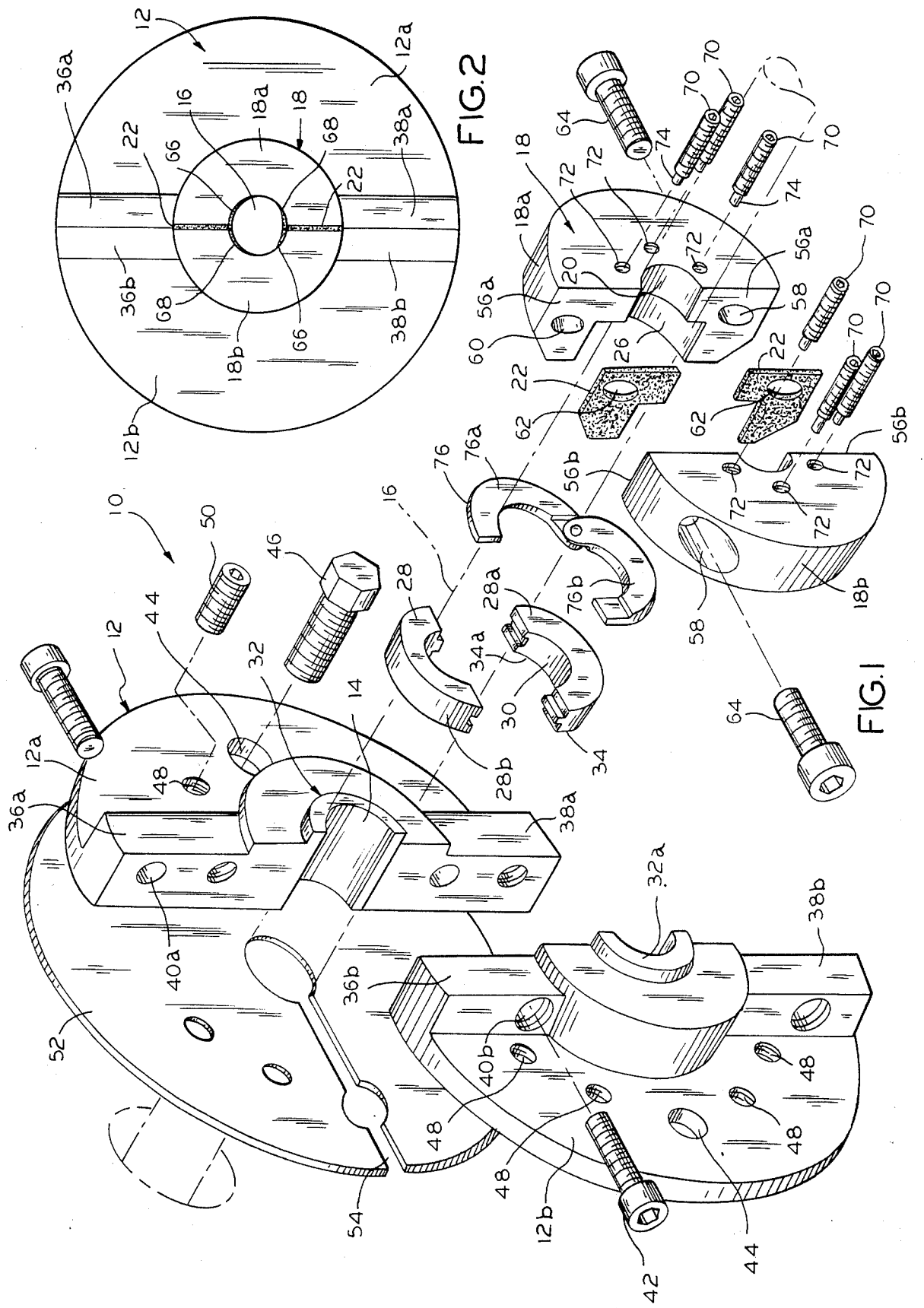

ROTATABLE SHAFT SEALING ASSEMBLY WITH FLOWABLE MATERIAL SPACER MEANS

FIELD OF THE INVENTION

This invention relates to shaft seals and, more particularly, to a sealing assembly for rotatable shafts.

BACKGROUND OF THE INVENTION

In various types of machinery, it is a continuing problem to seal the opening through which a rotatable shaft protrudes. The problem is manifested in the difficulty of preventing leakage or loss of pressure or loss of vacuum while at the same time avoiding undue shaft friction. As will be appreciated, shaft friction can generate heat, cause loss of power, and even damage the machinery.

One method of effecting a seal at a joint between a stationary element and a rotatable shaft has been through the use of packing, stuffing, or the like. However, packing or stuffing causes considerable friction on the shaft. Another method of effecting a seal has been to utilize O-rings. However, O-rings are subject to wear particularly when utilized with shafts that operate at high speed.

Another problem with conventional seals is that, for the most part, the machinery has to be stripped or dismantled for replacement purposes. The necessity for stripping or dismantling the machinery is most undesirable particularly where the machinery being sealed is large and heavy. Moreover, in order to replace conventional mechanical seals, the machinery must oftentimes be shut down for prolonged periods of time resulting in enormous losses in productivity.

As a result, it has been recognized as desirable to provide the parts of a mechanical seal which are subject to wear in split fashion so that they can be easily mounted and later disassembled for repair or replacement purposes. This was successfully accomplished in my earlier U.S. Pat. Nos. 4,215,870 and 4,423,878 issued, respectively, on Aug. 5, 1980 and Jan. 3, 1984, and seals manufactured according to my patents have been installed and proven to be highly effective not only in terms of their sealing capabilities but also in terms of their drastic reduction in down time of expensive machinery used in costly processes. With the features of the inventions of my earlier patents, a split-type seal has been provided which can be easily assembled and disassembled relative to machinery without interfering with the positioning or mounting of the stationary element and the rotatable shaft associated with it.

With attempts prior to my earlier patents to provide a split-type seal, it had been a problem to maintain a complete seal at all times completely about the rotatable shaft. During operation, the seals could easily become worn or deteriorated and the wear and deterioration could be non-uniform circumferentially about the shaft because of a number of reasons such as misalignment of the shaft with respect to the machinery with which it is used, or due to other factors. However, I was able to provide a sealing assembly which overcame the problem of non-uniform wearing or deterioration of the seal parts.

As set forth in my earlier U.S. Pat. No. 4,423,878, I later became aware of still additional problems requiring a solution. For instance, sealing assemblies are oftentimes needed in emergency situations. This is particularly true in applications which advantageously utilize the rotatable shaft seal disclosed and claimed in my earlier U.S. Pat. No. 4,215,870 where a seal is quickly needed on machinery used, for instance, in dangerous manufacturing processes such as the grinding of caustic chemicals and the like where time is of the essence and the seal must be made available in the field on extremely short notice. However, the shafts of such machinery vary significantly in size. Since time is of the essence in these applications, and it is not feasible to custom order a split seal from the manufacturer, field service personnel have been required to stock a large variety of seals in order to be able to service a customer on a timely basis.

In my earlier U.S. Pat. No. 4,423,878, I successfully overcame these problems with a unique sealing assembly, kit and method for rotatable shafts. This was done by providing a separate insert adapted to be mounted in an insert-receiving opening in the stationary seal member wherein a shaft-receiving opening in the insert is initially dimensioned so as to be smaller than a rotatable shaft and is thereafter adapted to be enlarged in the field before use so as to generally conform to the rotatable shaft. With this arrangement, the sealing assembly is uniquely suited to be selectively supplied in kit form.

Despite the significant advances offered by my earlier U.S. Pat. Nos. 4,215,870 and 4,423,878, I have become aware of still other problems with shaft seals. In particular, it is simply impossible to provide rotatable collars with exactly the dimension of any given shaft due to the normal range of tolerances for shafts. Accordingly, without precise machining by the ultimate user, leakage can occur which is entirely unacceptable in numerous applications where dangerous materials are involved.

The present invention is directed to overcoming the above stated problems and accomplishing the stated objects.

SUMMARY OF THE INVENTION

It is therefore a principal object of the present invention to provide a sealing assembly for a device having a rotatable shaft. More specifically, it is an object of the invention to provide rotatable seal means including a collar having an opening generally conforming to the shaft. It is likewise an object of the invention to provide spacer means adapted to be disposed between substantially identical portions of the collar to sealingly conform to the shaft within a normal tolerance range for shafts.

An exemplary embodiment of the invention achieves the foregoing objects in a sealing assembly for a device having a rotatable shaft. The sealing assembly includes stationary seal means in association with the device having an opening generally conforming to the rotatable shaft together with rotatable seal means adapted to engage and cooperate with the stationary seal means for effecting a seal therebetween. The rotatable seal means is adapted to be mounted on the rotatable shaft for rotational movement therewith and includes a collar having an opening generally conforming to the rotatable shaft. The opening in the collar is defined by a normally undersized shaft-confronting surface and the collar is split through the opening along a diameter to include a pair of substantially identical portions. The sealing assembly also includes spacer means formed of a flowable material adapted to be disposed between the substantially identical portions of the collar for sealingly conforming the collar to the rotatable shaft within a normal tolerance range for rotatable shafts. With this arrangement, means are provided for securing the substantially identical portions of the collar together in engagement with the rotatable shaft to cause the flowable material of the spacer means to fill any gaps between the collar and the rotatable shaft.

In the exemplary embodiment, the collar has a recess surrounding the opening dimensioned larger than the opening to receive a seal insert. The seal insert also has an opening generally conforming to the rotatable shaft. Moreover, the seal insert has a surface engaging and cooperating with the rotatable shaft to effect a seal therebetween.

With this construction, the seal insert is preferably split through the shaft conforming opening along a diameter into a pair of substantially identical portions. In addition, the substantially identical portions of the seal insert are preferably adapted to be disposed in interference fit fashion within the recess in the collar.

Also, in the exemplary embodiment, the substantially identical portions of the collar each have a pair of symmetrical surfaces lying in a common plane extending axially relative to the rotatable shaft. Advantageously, the symmetrical surfaces are generally L-shaped. In addition, the substantially identical portions of the collar are adapted to be secured together with corresponding ones of the symmetrical surfaces in abutment through the spacer means.

In the preferred embodiment, the spacer means includes a pair of generally L-shaped planar pads adapted to be disposed between corresponding ones of the symmetrical surfaces. The securing means for the substantially identical portions of the collar can then include a bore extending through each of the corresponding ones of the symmetrical surfaces and adapted to be disposed in alignment with a corresponding bore in one of the generally L-shaped planar pads with all of the bores extending in a generally tangential direction radially outwardly of the rotatable shaft. As a result, bolt means can be utilized to draw the substantially identical portions of the collar together so as to cause the generally L-shaped planar pads to flow radially inwardly to fill any gaps between the collar and the rotatable shaft.

Other objects and advantages will become apparent from the following specification taken in connection with the accompanying drawings.

DESCRIPTION OF THE DRAWINGS

FIG. 1 is an exploded perspective view of the sealing assembly of the present invention; and FIG. 2 is a front elevational view of the sealing assembly assembled on a rotatable shaft.

DESCRIPTION OF THE PREFERRED EMBODIMENT

An exemplary embodiment of a sealing assembly for a device having a rotatable shaft is illustrated in FIG. 1. The sealing assembly 10 includes stationary seal means 12 in association with the device having an opening 14 generally conforming to the rotatable shaft 16. It will also be seen that the sealing assembly 10 includes rotatable seal means 18 adapted to be mounted on the rotatable shaft 16 for rotational movement therewith. The rotatable seal means 18 includes a collar adjacent the stationary seal means 12 having an opening 20 generally conforming to the rotatable shaft 16. In addition, and as will be described in detail hereinafter, the rotatable seal means 18 includes means for engaging and cooperating with the stationary seal means 12 and rotatable shaft 16 for effecting seals therebetween.

Still referring to FIG. 1, the opening 20 in the collar 18 is defined by a normally undersized shaft-confronting surface 20a dimensioned smaller than the rotatable shaft 16. It will also be seen that the collar 18 is split through the opening 20 along a diameter to include a pair of substantially identical portions 18a and 18b. With this arrangement, the sealing assembly 10 includes spacer means or pads 22 adapted to be disposed between the substantially identical portions 18a and 18b of the collar 18.

In accordance with the present invention, the spacer means or pads 22 are formed of a flowable material such as that sold under the trademark Teflon. This unique feature is advantageous because it accomplishes the objective of filling any gap between the collar 18 and the rotatable shaft in a manner to be described more fully hereinafter. As a result, the spacer means or pads 22 adapt the collar 18 to sealingly conform to the rotatable shaft 16 within a normal tolerance range for rotatable shafts.

As shown in FIG. 1, the sealing assembly 10 includes means for securing the substantially identical portions 18a and 18b of the collar 18 together in firm engagement with the rotatable shaft 16. It will be appreciated that the securing means, which will be discussed hereinafter, causes the flowable material of the spacer means or pads 22 to fill any gaps between the collar 18 and the rotatable shaft 16. Because of the spacer means or pads 22 of the invention, the opening 20 in the collar 18 can be undersized, as previously discussed, and forced together by the securing means for rotational movement with the rotating shaft 16.

As shown, the collar 18 has a recess 26 surrounding the opening 20 and dimensioned larger than the opening 20 to receive a seal insert 28 having an opening 30 therein. The opening 30 in the seal insert 28 generally conforms to the rotatable shaft 16 and is defined by a surface comprising at least a portion of the means for engaging and cooperating with the rotatable shaft to effect a seal therebetween. In addition, the seal insert 28 is split through the shaft-conforming opening 30 along a diameter into a pair of substantially identical portions 28a and 28b adapted to be disposed in interference fit fashion within the recess 26 in the collar 18.

As shown in FIGS. 1 and 2, the stationary seal means 12 comprises a face plate adapted to be mounted on a device about the rotatable shaft 16. The opening 14 in the face plate 12 is defined by a shaft-confronting surface 14a dimensioned the same as or larger than the rotatable shaft 16. Moreover, the face plate 12 is split through the opening 14 along a diameter into a pair of substantially identical portions 12a and 12b.

As shown, the face plate 12 includes an axially projecting flange 32 defining a sealing surface 32a. The sealing surface 32a corresponds to a sealing surface 34a on the face 34 of the seal insert 28 which comprises means for engaging and cooperating with the stationary seal means 12 to effect a seal therebetween. As will be appreciated, the sealing surfaces 32a and 34a are in engagement to effect the seal.

As best shown in FIG. 1, the sealing assembly 10 includes means for securing the substantial identical portions 12a and 12b of the face plate 12 together in assembled relation. In particular, the securing means can advantageously include mating radially extending flanges 36a, 36b and 38a, 38b having aligned pairs of bores such as 40a, 40b adapted to receive threaded fasteners such as 42 in the manner taught in my earlier U.S. Pat. No. 4,423,878, issued Jan. 3, 1984, the teachings of which are incorporated herein by reference. Moreover, the sealing assembly 10 also includes means for mounting the face plate 12 on the device in a properly aligned fixed position about the rotatable shaft 16.

With regard to the mounting means, it may advantageously include diametrically opposed bores 44 adapted to receive threaded fasteners such as 46. It may also advantageously include radially spaced bores 48 adapted to receive aligning screws 50, all generally in accordance with the teachings of my earlier U.S. Pat. No. 4,423,878, issued Jan. 3, 1984, the teachings of which are again incorporated herein by reference. In addition, a face plate gasket 52 radially split as at 54 may be provided between the face plate 12 and the device utilizing the sealing assembly 10.

As will be appreciated, the set screws 50 are utilized to align the face plate 12 in a plane transverse to the rotatable shaft. It will also be appreciated that the set screws 50 cooperate with the threaded fasteners 46 to maintain the face plate 12 in a fixed position properly aligned in the transverse plane. As a result, the sealing surface 32a will be disposed transverse to the rotatable shaft 16 and adapted for cooperation with the sealing surface 34a in the manner described above.

Referring once again to the collar 18, the substantially identical portions 18a and 18b each have a pair of symmetrical surfaces 56a and 56b, respectively. It will be seen that the symmetrical surfaces 56a and 56b lie in a common plane extending axially relative to the rotatable shaft and each of the symmetrical surfaces is generally L-shaped. In addition, the substantially identical portions 18a and 18b of the collar 18 are adapted to be secured together with corresponding ones of the symmetrical surfaces 56a and 56b in abutment through the spacer means or pads 22.

As can be seen, a pair of generally L-shaped planar pads 22 are provided to conform to the mating pairs of symmetrical surfaces 56a and 56b. It will also be seen that the securing means for the substantially identical portions 18a and 18b of the collar 18 includes not only the bore 58 extending through each of the corresponding ones of the symmetrical surfaces 56a but also an internally threaded bore such as 60 extending through each of the corresponding ones of the symmetrical surfaces 56b. In addition, the generally L-shaped planar pads 22 each have a bore 62 adapted to be disposed in alignment with the respective bores 58 and 60 through the corresponding ones of the symmetrical surfaces 56a and 56b.

Referring to FIG. 1, the bores 58, 60 and 62 extend in a generally tangential direction and radially outwardly of the rotatable shaft. It will also be seen that bolt means such as the threaded bolts 64 are provided to extend through the bores 58 and 62 and be threaded into the internally threaded bores 60. With this arrangement, the threaded fasteners 64 are adapted to draw the substantially identical portions 18a and 18b of the collar 18 together so as to cause the generally L-shaped planar pads 22 to flow radially inwardly to fill any gaps between the collar 18 and the rotatable shaft 16.

While a preferred embodiment of the sealing assembly 10 has been described for purposes of illustration, it will be understood that the symmetrical surfaces 56a and 56b may be of another shape lying in common or closely adjacent planes extending axially relative to the rotatable shaft 16. It is only necessary that the substantially identical portions 18a and 18b of the collar 18 be adapted to be secured together with corresponding ones of the symmetrical surfaces 56a and 56b in abutment through the spacer means or pads 22. As a result, a pair of generally planar pads 22 may be provided for use with the substantially identical portions 18a and 18b of the collar 18 both conforming to and adapted to be disposed in the collar 18 between the symmetrical surfaces 56a and 56b to extend radially inwardly to the rotatable shaft 16.

Referring to FIG. 2, a unique feature of the present invention can be understood. It will be seen that the sealing assembly 10 is assembled such that the the substantially identical portions 18a and 18b have been forced together so as to cause the generally planar pads 22 to flow radially inwardly to fill small gaps between the collar 18 and the rotatable shaft 16 as at 66 and 68. It is this unique feature coupled with providing the opening 20 in the collar 18 with a normally undersized shaft-confronting surface 20a dimensioned smaller than the rotatable shaft 16, that makes it possible to sealingly conform the collar 18 to any rotatable shaft within a normal tolerance range for shafts. As a result, the present invention represents a significant advancement in the art which overcomes problems of serious consequences where leakage must be prevented.

One final aspect of the present invention is the utilization of biasing means to force the sealing surface 34a of the seal insert 28 into engagement with the sealing surface 32a on the axially projecting flange 32 to effect a seal therebetween. It will be seen that at least one, and preferably a plurality of spring assemblies 70 adapted to be threaded into internally threaded bores 72 in the collar 18 are provided for this purpose and include plungers 74 which are spring biased by means such as those described and claimed in my earlier U.S. Pat. No. 4,215,870 issued Aug. 5, 1980, the teachings of which are incorporated herein by reference. With this construction, a pusher plate 76 formed of two substantially identical and pivotally connected plate portions 76a and 76b can be disposed in the recess 26 between the plunger 74 and the seal insert 28.

With the sealing assembly of the present invention, a significant advancement in the art has been provided. It is now possible not only to provide a highly effective and economical split-type rotatable shaft seal, but also to do so in a fashion which permits maximum versitility and servicing of customers in emergency situations on a timely basis which could otherwise cause costly damage and/or down time in a wide variety of manufacturing processes by reason of the fact that rotatable shafts within a normal tolerance range for shafts can be sealingly engaged. By eliminating serious problems associated therewith, the present invention has accomplished what those skilled in the art have heretofore thought impossible.

While in the foregoing specification a detailed description of the invention has been set forth for purposes of illustration, it will be appreciated by those skilled in the art that the details herein given may be varied without departing from the spirit and scope of the invention as defined by the appended claims.

I claim:

1. A sealing assembly for a device having a rotatable shaft, comprising:

stationary seal means associated with said device and having an opening generally conforming to said rotatable shaft;

rotatable seal means including means for engaging and cooperating with said stationary seal means for effecting a seal therebetween, said rotatable seal means being adapted to be mounted on said rotatable shaft for rotational movement therewith, said rotatable seal means also including means for engaging and cooperating with said rotatable shaft for effecting a seal therebetween;

said rotatable seal means further including a collar having an opening generally conforming to said rotatable shaft, said opening in said collar being defined by a normally undersized shaft confronting surface dimensioned smaller than said rotatable shaft and said collar being split through said opening, said collar being split along a diameter to include a pair of substantially identical portions;

spacer means adapted to be disposed between said substantially identical portions of said collar, said spacer means being formed of a flowable material to fill any gap between said collar and said rotatable shaft, said spacer means adapting said collar to sealingly conform to said rotatable shaft within a normal tolerance range for rotatable shafts; and means for securing said substantially identical portions of said collar together in engagement with said rotatable shaft, said securing means causing said flowable material of said spacer means to fill any gaps between said collar and said rotatable shaft.

2. The sealing assembly as defined by claim 1 wherein said collar has a recess surrounding said opening dimensioned larger than said opening to receive a seal insert, said seal insert having an opening generally conforming to said rotatable shaft, said seal insert having a surface comprising at least a portion of said means for engaging and cooperating with said rotatable shaft to effect a seal therebetween.

3. The sealing assembly as defined by claim 2 wherein said seal insert is split through said shaft conforming opening along a diameter into a pair of substantially identical portions, said substantially identical portions of said seal insert being adapted to be disposed in interference fit fashion within said recess in said collar.

4. The sealing assembly as defined by claim 1 wherein said collar has a recess surrounding said opening dimensioned larger than said opening to receive a seal insert, said seal insert having an opening generally conforming to said rotatable shaft, said seal insert having a sealing surface comprising said means for engaging and cooperating with said stationary seal means to effect a seal therebetween.

5. The sealing assembly as defined by claim 4 wherein said seal insert is split through said shaft conforming opening along a diameter into a pair of substantially identical portions, said substantially identical portions of said seal insert being adapted to be disposed in interference fit fashion within said recess in said collar.

6. The sealing assembly as defined by claim 4 wherein said stationary seal means comprises a face plate adapted to be mounted on said device about said rotatable shaft, said opening in said stationary seal means being defined by a shaft confronting surface of said face plate dimensioned the same as or larger than said rotatable shaft, said face plate being split through said shaft-confronting surface defining said opening along a diameter into a pair of substantially identical portions.

7. The sealing assembly as defined by claim 6 wherein said face plate includes an axially projecting flange, said flange defining a sealing surface corresponding to said sealing surface of said seal insert, said sealing surfaces of said seal insert and said flange being in engagement to effect a seal therebetween.

8. The sealing assembly as defined by claim 6 including means for securing said substantially identical portions of said face plate together and also including means for mounting said face plate on said device about said rotatable shaft.

9. The sealing assembly as defined by claim 8 including means for aligning said face plate in a plane transverse to said rotatable shaft, said aligning means cooperating with said mounting means to maintain said face plate in said transverse plane.

10. The sealing assembly as defined by claim 3 wherein said substantially identical portions of said collar each have a pair of symmetrical surfaces lying in a common plane extending axially relative to said rotatable shaft, said symmetrical surfaces being generally L-shaped, said substantially identical portions of said collar being adapted to be secured together with corresponding ones of said symmetrical surfaces in abutment through said spacer means.

11. The sealing assembly as defined by claim 10 wherein said spacer means includes a pair of generally L-shaped planar pads conforming to said symmetrical surfaces, said generally L-shaped planar pads being adapted to be disposed between corresponding ones of said symmetrical surfaces.

12. The sealing assembly as defined by claim 11 wherein said securing means for said substantially identical portions of said collar include a bore extending through each of said corresponding ones of said symmetrical surfaces, said generally L-shaped planar pads each having a bore adapted to be disposed in alignment with said bore through said corresponding ones of said symmetrical surfaces, said bores extending in a generally tangential direction and radially outwardly of said rotatable shaft.

13. The sealing assembly as defined by claim 12 wherein said securing means for said substantially identical portions of said collar include bolt means adapted to extend through said bores in said symmetrical surfaces and said generally L-shaped planar pads, said bolt means being adapted to draw said substantially identical portions of said collar together so as to cause said generally L-shaped planar pads to flow radially inwardly to fill any gaps between said collar and said rotatable shaft.

14. The sealing assembly as defined by claim 1 wherein said substantially identical portions of said collar each have a pair of symmetrical surfaces lying in a common plane extending axially relative to said rotatable shafts, said substantially identical portions of said collar being adapted to be secured together with corresponding ones of said symmetrical surfaces in abutment through said spacer means.

15. The sealing assembly as defined by claim 14 wherein said spacer means includes a pair of generally planar pads conforming to said symmetrical surfaces, said generally planar pads being adapted to be disposed between corresponding ones of said symmetrical surfaces, said generally planar pads extending radially inwardly to said rotatable shaft.

16. The sealing assembly as defined by claim 15 wherein said securing means for said substantially identical portions of said collar is adapted to force said substantially identical portions of said collar together so as to cause said generally planar pads to flow radially inwardly to fill any gap between said collar and said rotatable shaft.

17. The sealing assembly as defined by claim 7 including at least one spring assembly disposed on said collar and acting against said seal insert to force said sealing surfaces of said seal insert and said axially projecting flange into engagement to effect a seal therebetween.

18. The sealing assembly as defined by claim 17 including a pusher plate disposed between said spring assembly and said seal insert.

* * * * *